Patented Nov. 9, 1937

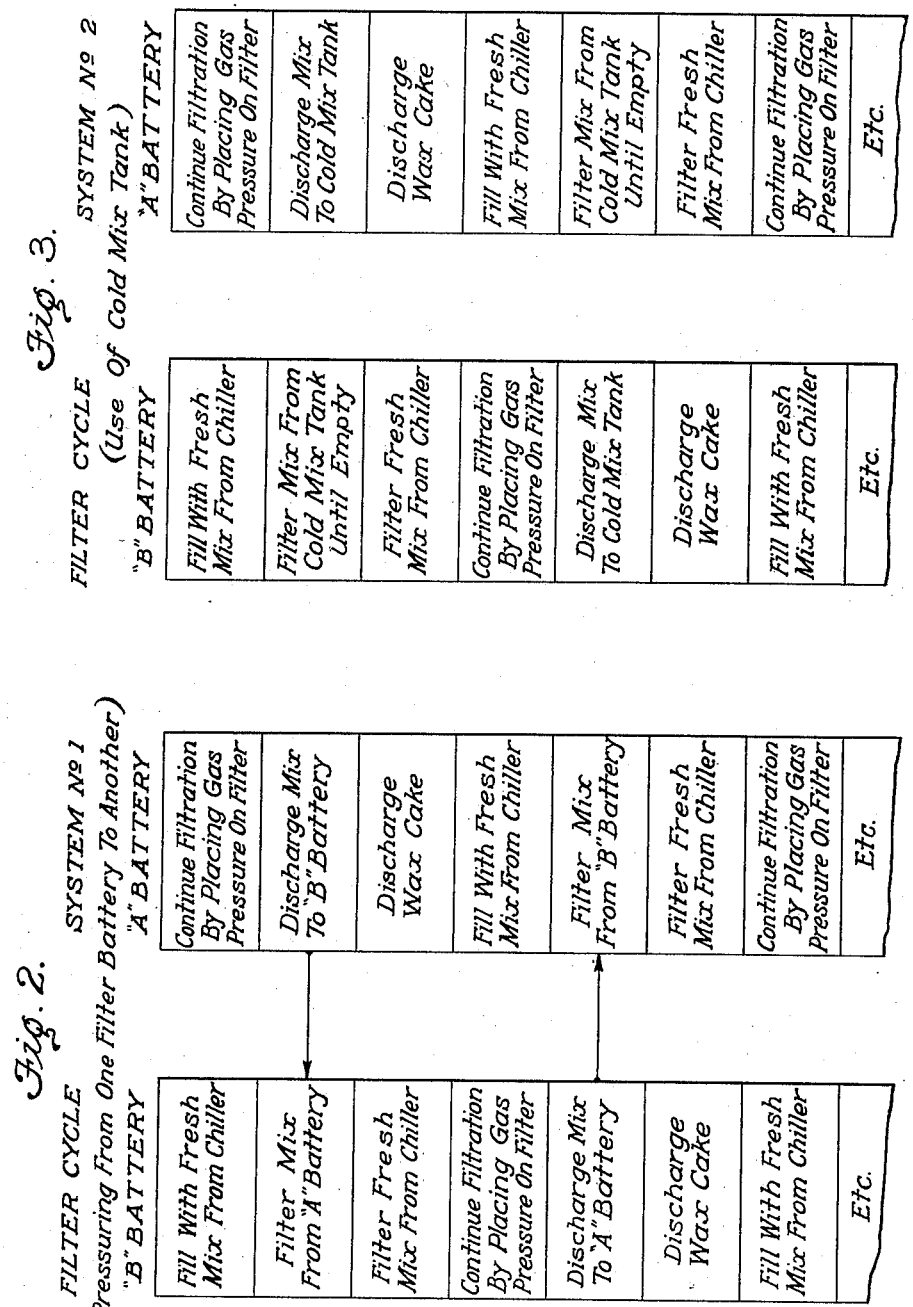

2,098,545

UNITED STATES PATENT OFFICE 2,098,545

PROCESS FOR FILTERING WAX FROM OILS

Basil Hopper and Kenneth Kingman, Palos Verdes Estates, Calif., assignors to Union Oil Company of California, Los Angeles, Calif., a corporation of California Application March 25, 1935, Serial No. 12,770

12 Claims. (Cl. 196—19)

This invention relates to the separation of wax from oils and it relates more particularly to a system of filtering precipitated wax from chilled slurries of oil, diluent and precipitated wax.

Oils have been dewaxed by dissolving them in a light liquid hydrocarbon, preferably a liquefied normally gaseous hydrocarbon such as propane. The mixture is then chilled to crystallize the wax by vaporizing a portion of the hydrocarbon under reduced pressure. By employing propane under pressure as the diluent-refrigerant, temperatures of approximately —40° F. may be obtained by gradually releasing the pressure to atmospheric or below. At such temperatures, substantially all of the wax may be crystallized in the oil and remaining diluent. The chilled slurry is then passed into a closed shell containing a plurality of filter leaves wherein the oil and solvent is forced through the canvas cloths of the filter leaves into a central chamber from which it is withdrawn while the wax accumulates as a wax cake upon the outer cloths of the filter leaves. When a sufficient quantity of wax has accumulated upon the filter leaves, the filtration of further quantities of oil is discontinued and the filter shell is emptied of unfiltered slurry. In emptying the filter, this slurry must be pumped or otherwise transferred to a container with the result that it becomes worked. In future discussion of this slurry, it will be termed as "old mix" or "worked mix" as distinguished from "fresh mix" which comprises slurry which has been freshly chilled, has not been worked and has set for any appreciable length of time and which is easily filterable. The wax cake on the filter cloths is then washed with cold solvent and subsequently removed from the cloths and filter shell.

In some processes, provision has been made for recovering the oil from old mix emptied from the filter shells. We have discovered that if the old mix is allowed to accumulate and allowed to set for any appreciable length of time, the mixture becomes difficult to filter. The wax appears to clog the pores of the filter cloths. Also, when the slurry is transferred back and forth from the filters to a surge tank, the continued working of the slurry soon produces a mass which cannot be filtered under any condition. We have also discovered that if freshly chilled mix is allowed to set or stand for any appreciable length of time, it also becomes difficultly filterable.

It is an object of our invention to provide an improved system and method of handling chilled diluted oil-wax slurries so as to prevent the foregoing difficulties of producing unfilterable or difficultly filterable masses and thus to provide a system in which high filter rates of oil and economy in oil yield are obtained.

A further object of our invention is to provide a system of filtering chilled slurries of diluted oil and wax in which the old mix from the filter shells or difficultly filterable slurry may be filtered without impairing filter rates.

We have discovered that if the filters are first filled with a mixture of freshly chilled diluted oil-wax slurry or easily filterable slurry at the start of the filtration cycle, the old or worked mix from the filter shells or difficultly filterable slurry may be successfully filtered behind the fresh mixture. Thus, in other words, if a good wax cake is first formed on the filter leaves by filtering fresh slurry, the old mix can then be filtered without impairing filter rates, whereas if the old mix is used to initially fill the filter, the filter rates obtained are less than half those obtained if a wax cake is first laid down on the filter leaves from a fresh mix.

Thus, one of the features of our invention resides in first filling a fresh filter or battery of filters with easily filterable or freshly chilled slurry of diluted oil and crystallized wax at the start of the filtration cycle and subsequently passing the old mix into the freshly filled filter.

Another feature of the invention is in the use of two banks or batteries of filters with separate charging means for each and with lines connecting one battery with the other so as to permit transfer of chilled slurry from one battery to the other battery of filters.

A most important feature of our invention resides in completely working out or passing to the filters filled with fresh mix, old mix from one battery of filters or from a cold mix tank which may be used to collect the old mix from the filters before any filter cycle is completed. This is done to prevent accumulation of old mix in the system which apparently becomes non-filterable after standing for some time and greatly impairs the filtration characteristics of any fresh slurry with which it is mixed.

Another important feature of our invention lies in a procedure for purging out the old or worked mix after it has been completely passed to a filter behind the freshly chilled slurry. This is accomplished by continuing filtration with fresh mix for sufficient time to purge the old mix present in the filter shell through the filter. Thus, the mix which is later emptied from the filter shell preparatory to discharging the wax cake is largely fresh mix which has been passed to the filter shell in purging out the old mix passed to the shell. This procedure prevents the accumulation of old mix in the system which has been worked more than one or two times and thus allows maximum filtration rates to be obtained in the system.

Another feature of the invention resides in effecting transfer and filtration of chilled slurry from the chillers to the filters by imposing gas pressure on the chilled slurry in the chillers. It is also a feature of the invention to transfer all of the old mix from one battery of filters to the other by fluid pressure. This system prevents undue overworking of the chilled mixture and thus prevents production of non-filterable mixtures.

An important feature of the invention resides in continuing the filtration of the contents in a filter shell after feed of mixture to the filter has been discontinued by closing the feed valve, which filtration is accomplished by imposing gas pressure on the filter shell. This procedure is usually continued until about one-third of the contents of the filter shell is filtered, thereby leaving less mix in the filter shell to be worked in emptying the filter shell for discharge of wax cake.

Various other objects and features of our invention will become apparent to those skilled in the art from the following description of the invention taken from the drawings in which Fig. 1 represents a diagrammatic plan of our entire system which is adapted to carry out our invention;

Fig. 2 represents one filter operation cycle;

Fig. 3 represents another filter operation cycle.

Figure 1:
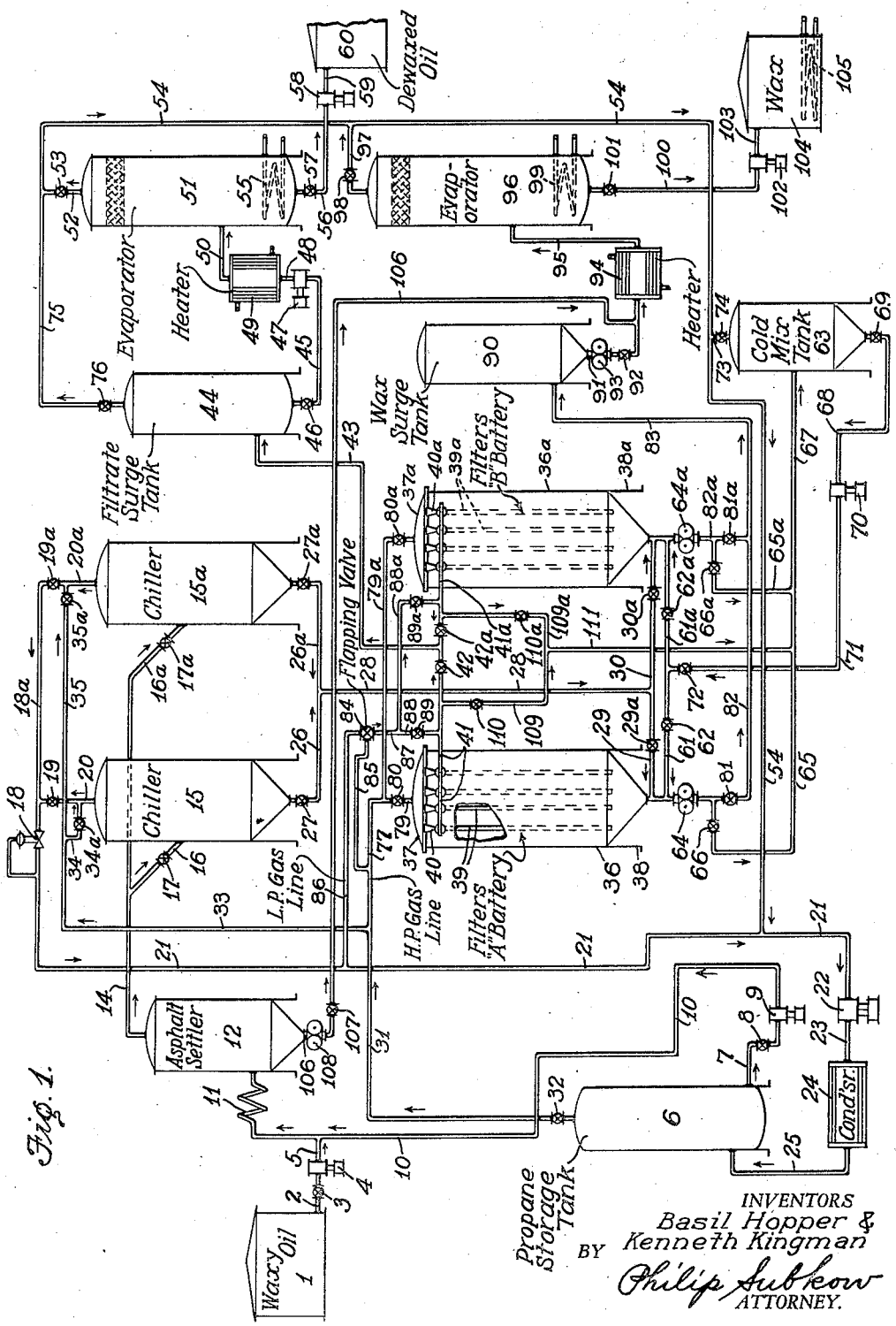

Our invention will be described as used for the separation of wax from an S. A. E. 50 lubricating oil distillate produced from Santa Fe Springs crude petroleum. It should be understood, however, that the invention is equally applicable to the separation of wax from any wax bearing oils whether they comprise lubricating oil distillates or waxy petroleum residues.

In the description of our preferred embodiment, we will describe the use of commercial propane as a combined diluent and refrigerant. However, it should be understood that other liquefied normally gaseous hydrocarbons, such as ethane, ethylene, propane, propylene, butane, isobutane, butylene, etc. may be used either separately or in admixture with each other. Instead of using liquefied normally gaseous hydrocarbons, we may use normally gaseous ethers such as methyl ether or we may use halogenated hydrocarbons such as methyl chloride or dichlor-difluor-methane or oxygenated compounds such as ethylene oxide. We may use normally liquid hydrocarbons such as gasoline, casinghead gasoline, naphtha and the like; these may be used in admixture with the above normally gaseous diluents. We may use normally liquid anti-solvents for wax such as acetone, acid esters, etc. or mixtures of liquid anti-solvents with miscibility agents such as benzene or mixtures of benzene with naphtha. In our preferred embodiment, we effect practically complete deasphalting and dewaxing of the oil by the use of commercial propane.

Referring to Fig. 1, the S. A. E. 50 waxy distillate produced from Sante Fe Springs crude oil is taken from tank 1 via line 2 controlled by valve 3 and is pumped by pump 4 into line 5 where it meets a stream of liquid propane under superatmospheric pressure sufficient to maintain the propane in the liquid state. This liquid propane is withdrawn from tank 6 via line 7, controlled by valve 8 and is pumped by pump 9 through line 10 into line 5 where the waxy oil is dissolved in the liquid propane. The mixture then passes through mixing coil 11 into an asphalt settler 12.

In asphalt settler 12, any asphalt contained in the oil is precipitated to the bottom of the settler while the asphalt-free solution of waxy oil and propane is decanted via line 14 and passed to a plurality of chillers 15, 15a, via lines 16, 16a, controlled by valves 17, 17a, respectively. While we have shown only two chillers, it will be understood that this number may be increased as desired or necessary. The solution of waxy oil and propane in the chillers is gradually chilled to a temperature of −40° F. by gradually vaporizing a portion of the propane under reduced pressure. Pressure is controlled by pressure regulating valve 18 on line 18a and valves 19 and 19a on lines 20 and 20a, respectively. By opening either valve 19 or 19a and valve 18, propane is permitted to vaporize under reduced pressure, the vaporized propane passing into line 21 to compressor 22 which boosts the propane to the condensation pressure of the propane, i. e. about 200 pounds. The highly compressed propane is then passed through line 23 and condenser 24, the condensed propane returning via line 25 to the propane storage tank 6.

It will be observed that while we have disclosed evaporative refrigeration for chilling the waxy oil and diluent to wax precipitation temperatures, other methods for chilling the solution may be used. Thus, for this purpose, we may resort to the use of external refrigeration where the waxy oil dissolved in a diluent is circulated in indirect heat exchange with cold brine or other cold medium.

In practical operation, the chillers are preferably operated alternately, that is, while one of the chillers is being filled with solution and then chilled, the other chiller is being emptied of chilled slurry to the filters. This may be accomplished by proper operation of valves on the line connecting these chillers. With the use of a large number of chillers, say five, the cycles of chilling operation should be such that different phases of the chilling cycle occur in the several chillers at the same time, that is, while one of the chillers is being filled with oil solvent solution, a second chiller is undergoing high pressure chilling, a third is undergoing low pressure chilling, a fourth is being emptied to the filters or a filter surge tank, if one is employed, and a fifth is being warmed preparatory to filling with fresh solution to be chilled. The latter operation has been found necessary in order to prevent shock chilling when the propane and waxy oil solution is introduced into it. The warming up of the empty cold chiller is preferably accomplished by passing the high pressure propane gas boiled from a filled chiller undergoing chilling into it until equilibrium between the two chillers is established, after which chilling of the mixture being chilled to −40° F. is accomplished by passing the vapors to the compressor.

The slurry of chilled oil, remaining propane, and crystallized wax at −40° F. is withdrawn from chiller 15 via line 26 controlled by valve 27 and passed into line 28 to the "A" battery filters via line 29 controlled by valve 29a or to the "B" battery filters via line 30 controlled by valve 30a where the precipitated wax is removed from the remaining oil and propane. The slurry from chiller 15a is withdrawn via line 26a controlled by valve 27a and passed into line 28 and thence to the filters as aforesaid. The transfer of the chilled mixture from the chillers is preferably accomplished by imposing gas pressure in the chillers. This is accomplished by passing high pressure propane gas from the top of storage tank 6 via line 31 controlled by valve 32 and line 33 into line 34 controlled by valve 34a to chiller 15 or line 35 controlled by valve 35a to chiller 15a. For this purpose, other gases may be employed such as compressed nitrogen, carbon dioxide or ethane. However, if desired, the chilled mixture may be pumped directly to the filters by providing a pump (not shown) on line 28. However, the pump should be of a type which will not unduly macerate or break up the wax crystals since this renders the mixture difficultly filterable. We find it desirable, however, to employ fluid pressure to charge the filters.

Referring to the filter system, it will be observed that each battery of filters "A" or "B" may comprise any desired number of separate filters which are connected in parallel to operate as one bank. The filters in each bank should also be connected as to cut out any filter in the bank. In practical operation, it is preferable to provide an extra filter in each battery to cut into the system when another is cut out for purposes of washing with a warm wax solvent.

The filter is preferably of the type disclosed in a co-pending application by one of us, Serial No. 727,841, filed May 28th, 1934, and may comprise a vertical cylindrical filter tank or shell 36, 36a, provided with a tightly fitted removable cover 37, 37a and skirts 38, 38a for supporting the tank. Supported in the body of the vertical cylindrical shell are a plurality of filter leaves 39, 39a. The filter leaves are connected to outlets provided with valves 40, 40a, the outlets being connected to discharge manifolds 41, 41a, respectively, controlled by valves 42, 42a, respectively.

The introduction of chilled slurry into either battery "A" or "B" is continued until the shells are completely filled with the mixture after which further introduction of chilled mixture under pressure will force the propane and oil through the canvas cloths of the filter leaves into the discharge manifolds, the wax collecting on the canvas cloths. The clear filtrate discharging into manifold 41 of "A" battery or 41a of "B" battery is passed via line 43 into filtrate surge tank 44. Cloudy filtrate and/or propane gas produced as will be described, is passed to a filter surge or cold mix tank 63 from "A" battery via by-pass line 109 and valve 110 or from "B" battery via by-pass line 109a and valve 110a and thence via lines 111, 65 and 67. The clear filtrate may be withdrawn from 44 as desired by a line 45 controlled by valve 46 and pump 47 which forces the filtrate through line 48, heater 49 and line 50 into vaporizer 51 in which vaporized propane is withdrawn via line 52 controlled by valve 53 and thence through line 54 to line 21, compressor 22, condenser 24 and storage tank 6. Steam circulating through closed coil 55 aids in vaporizing propane from the dewaxed oil. The depropanized and dewaxed oil is withdrawn from the bottom of the vaporizer via line 56 controlled by valve 57 and is pumped by pump 58 through line 59 into dewaxed oil storage tank 60.

Filtration of the chilled mixture in any one battery of filters is continued until a wax cake of about one-half to one inch thick is built on the filter leaves at which time the flow of chilled mixture containing the precipitated wax is stopped by closing the proper inlet valve 29a or 30a, depending upon which battery is in service. The contents remaining in the filter shells are then transferred, preferably by gas pressure, into the other battery of filters via line 61 controlled by valve 62 to line 61a, controlled by valve 62a into the "B" battery, for example, or vice versa from "B" battery into "A" battery, or alternatively the remaining contents in the filter shells may be passed to a filter surge tank or cold mix tank 63 by pumps 64, 64a, via lines 65, 65a, controlled by valves 66 and 66a, respectively, from which it passes into line 67 into the cold mix tank. The contents from the cold mix tank may be returned to the battery of filters via line 68 controlled by valve 69 and pumped by pump 70 through line 71 controlled by valve 72 through line 61 into "A" battery or line 61a into "B" battery filters. Line 73 controlled by valve 74 positioned at the top of the cold mix tank is connected with compressor 22 which permits propane to vaporize and maintain a low temperature of −40° F. in the cold mix tank. Line 75 controlled by valve 76 positioned at the top of the filtrate surge tank maintains a low pressure in the filtrate surge tank to permit flow of filtrate from the filter into the filtrate surge tank. The vapors from both the filtrate surge tank and the cold mix tank pass into line 54 and are recovered in propane storage tank 6 as heretofore explained.

When the old propane-waxy lubricating oil mix has been emptied out of the filters, the discharge valves are closed and the wax cake is subjected to a blowing operation with propane gas for the purpose of removing as much oil and propane from the wax cake as possible. This is accomplished by the introduction of propane gas under high pressure by lines 31 and 77 which passes the propane gas into the filter shells via line 79 or 79a, controlled by valves 80 and 80a, respectively. These lines are also used for pressuring the slurry from one battery to the other. The blowing with propane gas under pressure of 10 to 20 lbs. per square inch is continued for approximately one or two minutes to partially dry the wax cake after which the pressure is gradually raised by operation of valves 80 and 80a until a pressure of about 100 lbs. per square inch is reached in the filter shell. The blowing at this pressure is continued for a period of time necessary to give the maximum degree of washing of the wax cake which will be effected by condensation of the propane on the wax cake due to the high gas pressure existing in the chamber and the low temperature of the wax cake. This blowing is continued for about 10 or 15 minutes. The filtrate passed through the filter leaves resulting by the blowing operation is generally cloudy and, therefore, is discharged through the outlet pipes to by-pass line 110 or 110a and lines 111, 65, 67 to the cold mix tank. Propane gas will also pass to the cold mix tank and is removed via line 73. By controlling the operation of valves 110, 110a during the blowing operation to maintain a low pressure in the interior of the filter leaves, the condensed propane forced through the wax cake under high pressure will revaporize in the interior of the filter leaves resulting in a reduction in temperature to maintain the wax cake at a low temperature.

After drying the wax cake of oil and propane, the flow of propane gas into the filter shells is discontinued, after which valve 81 or 81a is opened and the wax cake is sloughed off the filter leaves and passed by pumps 64, 64a through lines 82, 82a and 83 to the wax surge tank 90. In order to accomplish removal of the wax cake from the filter leaves a reverse flow of propane-gas is resorted to. This is accomplished by means of a three-way valve 84 which is connected on one side by line 85 connected to the high gas pressure lines 31, 77 and on the other side by lines 86 and 21 to low gas pressure or vacuum which may comprise the suction of compressor 22. High pressure gas and vacuum are then alternately exerted on the interior of the filter leaves operating through lines 87 and 88 controlled by valve 89 and manifold line 41 for the "A" battery or lines 87, 88a controlled by valve 89a and manifold line 41a for the "B" battery. The application of high pressure flexes the canvas cloths outwardly and the turning of the three-way cock to vacuum draws or contracts the canvas cloths. This alternate bulging and contraction, otherwise known as "flapping" of the canvas cloths, dislodges the wax cake from the filter cloths; the dislodged wax dropping to the bottom of the filter from which it is withdrawn by gear pumps 64, 64a as aforesaid and passed to the wax surge tank 90. The wax is withdrawn from the wax surge tank 90 via line 91 controlled by valve 92 and pumped by gear pump 93 through heater 94, line 95 into evaporator 96 where the vaporized propane contained in the wax is withdrawn via line 97 controlled by valve 98 and passed via lines 54, 21 to compressor 22, condenser 24 to storage tank 6. Steam circulating through closed coil 99 aids in vaporizing propane from the wax. The depropanized wax is withdrawn from the bottom of the evaporator via line 100 controlled by valve 101 and is pumped by pump 102 through line 103 into wax storage tank 104 where it is maintained at a fluid temperature by steam circulating through closed coil 105.

The asphalt precipitated in separator 12 may be withdrawn via line 106 controlled by valve 107 by pump 108 and passed into line 91 and thence through the heater into the vaporizer. The asphalt may be recovered as a separate fraction by provision of separate propane recovery equipment or in admixture with the wax passing to the wax vaporizer.

In practical operation, we take the waxy oil from tank 1 at a temperature of approximately 130° F. and mix it with liquid propane at ordinary temperatures of 80 to 90° F. taken from storage tank 6 under a pressure of approximately 200 to 215 lbs. per square inch which is sufficient to maintain the mixture in the liquid state at the temperatures employed. This mixture at a temperature of 90 to 100° F. is then passed into asphalt settler 12 where any asphalt precipitated from the solution is allowed to settle to the bottom of the settler from which it is withdrawn via line 106. The amount of propane used will depend upon the character of the stock and the particular chilling procedures that are subsequently employed. We have effected adequate chilling to —45° F. with an initial ratio of 2.50 volumes of propane to one of the oil where make-up propane is injected into the chillers during evaporation of propane to compensate for the portion vaporized. If make-up propane is not used during the chilling cycle, the initial ratio of propane to oil should comprise approximately 4 to 6 volumes of propane to one of the oil.

The mixture decanted overhead from the asphalt settler 12 is then passed to the chillers 15 or 15a where the mixture is chilled by evaporation refrigeration, that is, by allowing a portion of the propane to vaporize under reduced pressure. The chilling should be preferably at a rate of ½ to 4° F. per minute. After chilling the mixture to approximately —45° F. by the application of vacuum by compressor 22, the chilled mix is pressured to the filters via lines 26 or 26a, 28 and 29 or 30 in which filtration may be accomplished either by System No. 1 (Fig. 2) or System No. 2 (Fig. 3).

Referring more particularly to Figures 1 and 2, the filter cycle of System No. 1 may be described as comprising six operations as follows:

*Operation No. 1.*—(Filling the filters with fresh mixture from the chiller). The freshly chilled unworked slurry of diluted oil and wax is pressured from a chiller into lines 28 and 30 into the "B" battery filters until full of fresh mix. Pressuring is obtained by introducing propane gas from the top of storage tank 6 via lines 31, 33 and 34 or 35 to the chiller containing freshly chilled mix. A pressure of approximately 30 to 35 lbs. per square inch is sufficient to transfer the cold slurry into the filters. In fact, it has been found advantageous to make the initial filtration at as low pressure as possible and to raise the pressure in the chiller very slowly. The purpose for this is to lay down a good wax cake on the filtering elements at low pressure so that subsequent increase in pressure will not affect filter rates. If a high pressure differential is placed on the filter at first, poor filter rates are obtained.

Since the intial filtrate may be cloudy, it is preferable to by-pass the filtrate into a separate surge tank 63 via lines 109a and 111. As soon as the sight glass on the filtrate discharge line 41a indicates that clear filtrate is being obtained, valve 110a in the by-pass line is closed, valve 42a is opened and the clear filtrate is permitted to pass to filtrate surge tank 44.

During the filling and initial filtering operation, the valves on the lines connecting the bottom of the "B" battery filters are closed. When the filter shells of "B" battery filters are full of fresh mix and clear filtrate is being obtained, the valve on the line connecting the bottom of the chiller is closed and valve 29a on line 29 is opened to permit carrying out of the second operation.

*Operation No. 2.*—(Filtration of old mix from opposite battery of filters.) In this operation, the used mix from the opposite battery of filters "A" and which is obtained after performing Operation No. 4 to be described is transferred over into "B" battery filters to be filtered behind the wax cake laid down from fresh mix as described above. The transfer is accomplished by fluid pressure operating through lines 31, 77 and 79. This operation is continued until the old mix in the "A" battery is completely pressured over into the "B" battery. During the last stages of this pressuring operation, the filtrate from "A" battery may turn cloudy due to warming up of the slurry and the blowing of gas through the leaves in which case valve 42 is closed and the cloudy filtrate is by-passed into the cold mix tank via lines 109, 111 and 67. However, it is important that the pressuring is continued until the "A" battery filters are completely empty in order to prevent accumulation of old mix in the system. Thereupon, valves 29a and 80 are closed and the "A" battery of filters are ready for "flapping" as will be described in connection with Operation No. 5.

*Operation No. 3.*—(Filtration of fresh mix from the chillers.) After the old mix from the "A"

battery is pressured over into the "B" battery filters, filtration with fresh mix from the chiller is continued by opening the valve at the bottom of the chiller and imposing pressure in the chiller. The duration of the feed of fresh mix to the filters should be continued for at least 20 or 30 minutes so as to permit the old mix pressured from the "A" battery to be completely worked out of the "B" battery filters. If old mix is allowed to remain in the filters, it will comprise overworked mix and will result in poor filter rates when this material is reworked in repressuring back to the "A" battery.

*Operation No. 4.*—(Continuing filtration in the filters after discontinuing feed.) After the old mix has been worked out of the "B" battery by introduction of fresh feed, the filters are closed to fresh feed by closing valve 30a but filtration of the contents in the filter shells is continued by placing gas pressure in the filter shells by opening valve 88a to the high pressure gas line 77. The purpose for this continued filtration is to filter as much of the contents in the filter shells as possible after the feed has been discontinued so that less worked mixture will remain for pressuring to the opposite battery of filters. Generally, approximately one-third of the contents in the filter shells are filtered in this manner. This operation is usually continued until the other battery of filters are filled with fresh mix and clean filtrate is obtained.

*Operation No. 5.*—(Discharge of old mix to opposite battery of filters.) The contents remaining in the "B" battery filters are then pressured over into the "A" battery filters through lines 30 and 29 in the manner described in connection with Operation No. 2. Transfer is obtained by means of gas pressure via line 79a and valve 80a, valves 29a and 30a being opened.

*Operation No. 6.*—(Discharge of wax cake.) When the filter shells have been emptied in accordance with Operation No. 5, the feed valve 30a for "B" battery, valve 80a and the valve 42a to the filtrate surge tank are closed and valve 110a is opened. The filters are ready for discharge of wax cake from the filter leaves by "flapping". Valve 81a on the wax discharge line is then opened and gear pump 64a is started. The leaves are then flapped to remove the wax cake from the filter leaves. This is accomplished by alternately applying gas pressure to the inside of the leaves and releasing this pressure to a low pressure zone such as the line connecting the suction of the compressor. Thus, by opening the three-way valve 84 first to the high pressure line 77 which permits propane gas to flow into the inside of the filter leaves via lines 87 and 88a, the high pressure bulges the canvas cloths on the filter leaves. Then by opening the three-way valve to the low pressure line, the canvas cloths are drawn or contracted. The alternating bulging and contraction or "flapping" of the canvas cloths dislodges the wax cake from the filter cloths and drops it to the bottom of the filter shells from which it is picked up by pump 64a and passed to wax surge tank 90. It will be observed that each of the pressuring and releasing periods should be continued for ten to fifteen seconds in order to make sure the filter canvas has time to flex in response to the applied pressure differential. The pressure differential from inside to outside of the leaves must not be greater than 10 lbs. per square inch since higher differential pressure will shorten the service life of the canvas.

At the conclusion of the wax discharge operation, the "B" battery filters are ready for the start of the next cycle.

It is apparent from the above procedure that small quantities of cloudy filtrate will be produced in the system during the periods that the filter shells are being filled with fresh mix (Operation No. 1) and near the end of the pressuring periods (Operations Nos. 2, 4, and 5). This accumulated cloudy filtrate may be pumped back into the filter shells from time to time immediately after having emptied one filter battery to the other and before resuming feed of fresh mix from the chiller to purge out the old mix, or the cloudy filtrate may be pumped simultaneously into the filter with the old mix. The accumulated material in the separate tank for cloudy filtrate must be maintained at −40° F. or colder before pumping back to the filter shells.

From the foregoing description and by reference to Fig. 2, it will be perceived that while one operation of the filter cycle is carried in one battery of filters, another operation is carried out in the other battery. The operations are so timed that when the "B" battery, for example, is ready for Operation No. 2, the "A" battery is ready for Operation No. 5 so that old mix need not remain in the system any longer than is necessary.

In Fig. 3 we have outlined the operation of the filter cycle of System No. 2. In this system instead of pressuring the old mix from one battery to the other as in System No. 1, the old mix in the filter shells is transferred to a cold mix tank and is then transferred to the opposite battery of filters after the filter shells have been filled with fresh mix. The various operations of the filter cycle may be outlined briefly as follows:

*Operation No. 1.*—The filter shells of "B" battery are filled at the start of each cycle with fresh mix from a chiller in the manner outlined for System No. 1, Operation No. 1.

*Operation No. 2.*—(Feeding the filter from the cold mix tank.) After the filters have been filled with fresh mix in accordance with Operation No. 1, valve 30a is closed and valves 69, 72 and 62a are opened, and pump 70 is started and old mix from the cold mix tank 63 is passed to the "B" battery until the cold mix tank is completely emptied as evidenced by the loss of pump suction, after which the foregoing valves are closed and the pump stopped. The old mix in the cold mix tank result from Operation No. 5 to be described.

*Operation No. 3.*—The filter battery is then fed from a chiller in the manner described for System No. 1, Operation No. 3.

*Operation No. 4.*—The feed valve 30a is then closed and the filter shells are pressured as outlined in Operation No. 4 of System No. 1 for a sufficient period of time to fill the other battery with fresh mix from a chiller and to bring it on stream.

*Operation No. 5.*—(Discharge of mix to the cold mix tank.) After the filtration has been continued by application of gas pressure in accordance with Operation No. 4, the remaining mix in the filter shells is pumped out to the cold mix tank. This is accomplished via line 67. During the pumping out period, sufficient propane gas is turned in at the top of the filter shells to maintain a differential pressure of 15 to 20 lbs. per square inch through the filter leaves. If this differential pressure is not maintained during the pumping out period, there is danger of the wax cake sloughing off the leaves and going out to the cold mix tank. The mix pumped out to the cold mix tank in this manner will obviously be pumped to the other filter battery when it is ready for Operation No. 2. The cold mix tank is preferably maintained at a low temperature, i. e. —40° F. by providing vapor outlet line 73 controlled by valve 74 connecting the suction of compressor 22.

*Operation No. 6.*—The filter battery is then flapped as outlined in Operation No. 6 of System No. 1 to complete the cycle.

The filtrate collecting in filtrate surge tank 44 may be withdrawn as desired via line 45, valve 46 and pump 47 and passed through heater 49 to separator 51 where the propane is separated from the dewaxed oil. The depropanized dewaxed oil is then passed to storage tank 60 from which it may be drawn and solvent extracted for the separation of non-paraffinic from the paraffinic oil fractions to produce a lubricating oil of high viscosity index. This fraction may be further treated with sulfuric acid and/or clay.

The wax collecting in wax surge tank 90 is withdrawn by gear pump 93 and passed through heater 94 into evaporator 96 where it is depropanized and then passed to storage tank 105. This wax may be further treated to produce water white high melting point wax by methods known in the art.

While we have described in more or less detail the preferred embodiments of our invention, it should be understood that these should not be considered as limiting as many variations may be made by those skilled in the art without departing from the spirit of the invention.

We claim:

1. A process for filtering difficultly filterable slurries of crystallized wax and oil which have been removed as the unfiltered portion from a previous filtration of an originally easily filterable slurry, which comprises introducing easily filterable slurry of crystallized wax, oil and a liquefied normally gaseous hydrocarbon diluent into a filter and subsequently introducing said difficultly filterable slurry into said filter to filter said difficultly filterable slurry, said oil in both of said easily and difficultly filterable slurries having substantially the same gravities.

2. A process for filtering difficultly filterable slurries of crystallized wax and oil which have been removed as the unfiltered portion from a previous filtration of an originally easily filterable slurry, which comprises chilling a solution of waxy oil in a diluent consisting predominantly of hydrocarbons having a vapor pressure between ethane and butane, to form a chilled slurry of crystallized wax, oil and diluent, introducing said chilled mixture into a filter and subsequently introducing said difficultly filterable slurry of crystallized wax, oil and diluent into said filter, said oil in both of said easily and difficultly filterable slurries having substantially the same gravities.

3. A process for filtering difficultly filterable slurries of crystallized wax and oil which comprises first filtering easily filterable slurry of crystallized wax and oil to form a wax cake, subsequently introducing said difficultly filterable slurry of crystallized wax and oil into said filter shell and subsequently introducing easily filterable slurry of crystallized wax and oil into said filter to force difficultly filterable slurry through said filter.

4. A process for filtering difficultly filterable slurries of crystallized wax and oil which comprises filling a filter chamber with easily filterable slurry of crystallized oil and wax to form a wax cake on the filter leaves of said filter, introducing said difficultly filterable slurry of crystallized wax and oil into said filter and subsequently introducing further quantities of easily filterable slurry into said filter and continuing filtration in said filter with said easily filterable slurry to replace substantially all of the difficultly filterable slurry introduced into said filter.

5. A process for filtering difficultly filterable slurries of crystallized wax and oil which comprises introducing chilled slurries of crystallized wax and oil into a filter under pressure until a wax cake of desired thickness is formed on the filter leaves of said filter, discontinuing the supply of chilled slurry to said filter and continuing filtration in said filter by imposing fluid pressure in said filter until a portion of the contents remaining in the filter shell after discontinuation of chilled slurry to said filter is filtered and discontinuing said filtration by imposed fluid pressure while a substantial portion of said contents still remains in said filter as a body of unfiltered slurry of crystallized wax and oil which may be readily withdrawn from said filter.

6. A process for separating wax from chilled slurries of crystallized wax, oil and a diluent consisting predominantly of hydrocarbons having a vapor pressure between ethane and butane which comprises filtering said chilled slurry in one filter unit until a wax cake of desired thickness is produced on the filter leaves of said unit, introducing further quantities of said chilled slurry into a second filter unit, introducing unfiltered slurry from said first mentioned filter unit into said second filter unit subsequent to introduction of chilled slurry into said second filter unit and subsequently removing the wax cake from said first mentioned filter unit.

7. A process for separating wax from chilled slurries of crystallized wax, oil and a diluent consisting predominantly of hydrocarbons having a vapor pressure between ethane and butane which comprises introducing freshly chilled slurry into one filter unit until a wax cake of desired thickness is formed on the filter leaves of said unit and subsequently discontinuing the supply of fresh chilled slurry into said unit, introducing freshly chilled slurry into a second filter unit to form a wax cake on the filter leaves of said second unit, withdrawing unfiltered slurry from said first mentioned unit and transferring same into said second filter unit and subsequently continuing filtration of freshly chilled slurry in said second filter unit until substantially all of the unfiltered slurry transferred from said first filter unit to said second filter unit has been filtered in said second filter unit and the filter shell of said second filter unit is filled with freshly chilled slurry.

8. A process for separating wax from chilled slurries of crystallized wax, oil and a diluent consisting predominantly of hydrocarbons having a vapor pressure between ethane and butane which comprises introducing freshly chilled slurry into one filter unit until a wax cake of desired thickness is formed on the filter leaves of said unit and subsequently discontinuing the supply of fresh chilled slurry into said unit, introducing freshly chilled slurry into a second filter unit to form a wax cake on the filter leaves of said second unit, withdrawing substantially all unfiltered slurry from said first mentioned unit and transferring same into said second filter unit and subsequently continuing filtration of freshly chilled slurry in said second filter unit until substantially all of the unfiltered slurry transferred from said first filter unit to said second filter unit has been filtered in said second filter unit and the filter shell of said second filter unit is filled with freshly chilled slurry.

9. A process for separating wax from oil which comprises dissolving waxy oil in a diluent consisting predominantly of hydrocarbons having a vapor pressure between ethane and butane and chilling the solution in a chiller to form a slurry of crystallized wax, oil and diluent, filling one filter unit of a plurality of filter units with said chilled slurry and providing unfiltered slurry in a second filter unit, transferring by fluid pressure the unfiltered slurry from said second unit to said first filter unit subsequent to filling of said first filter unit with chilled slurry until the unfiltered slurry in said second filter unit is completely discharged therefrom and transferred to said first filter unit, pressuring chilled slurry from the chiller to said first filter unit by fluid pressure to completely filter and replace the unfiltered slurry transferred from said second filter unit, continuing filtration in said first filter unit by imposing fluid pressure on said filter until a substantial portion of the chilled slurry in the filter shell of said first filter unit is filtered, pressuring the remaining unfiltered slurry by fluid pressure to said second filter unit after said second filter unit is filled with chilled slurry from the chiller until said unfiltered slurry is completely discharged from said first filter unit, removing the wax cake from the filter leaves of said first filter unit and repeating said cycles in said filter units.

10. A process for the separation of wax from oil which comprises dissolving waxy oil in a diluent consisting predominantly of hydrocarbons having a vapor pressure between ethane and butane and chilling the solution to form a slurry of crystallized wax, oil and diluent, introducing chilled slurry into a filter unit of a plurality of filter units, introducing unfiltered slurry withdrawn from a second filter unit and passed into a reservoir until said reservoir has been completely discharged of unfiltered slurry, continuing filtration in said filter unit by introduction of chilled slurry from the chiller and until the unfiltered slurry introduced into said first filter unit from the reservoir is completely filtered and the contents remaining in the filter comprise fresh chilled slurry from the chiller, withdrawing unfiltered slurry in said first filter and discharging same to said reservoir to be subsequently introduced into said second filter unit after said second filter unit is filled with fresh slurry from the chiller, removing the wax cake from the filter leaves of said filter unit and repeating said cycles of operation.

11. A process as in claim 2 wherein the diluent is propane.

12. A process as in claim 6 wherein the diluent is propane.

BASIL HOPPER.
KENNETH KINGMAN.